US006662297B1

(12) United States Patent
Boom et al.

(10) Patent No.: US 6,662,297 B1
(45) Date of Patent: Dec. 9, 2003

(54) ALLOCATION OF PROCESSOR BANDWIDTH BY INSERTING INTERRUPT SERVICING INSTRUCTIONS TO INTERVENE MAIN PROGRAM IN INSTRUCTION QUEUE MECHANISM

(75) Inventors: Douglas D. Boom, Portland, OR (US); Matthew M. Gilbert, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,834

(22) Filed: Dec. 30, 1999

(51) Int. Cl.[7] .................................................. G06F 9/50
(52) U.S. Cl. ...................... 712/245; 709/104; 709/108; 710/264; 710/267; 712/228; 712/244
(58) Field of Search ................................. 710/264, 267; 709/104, 108; 712/244, 245, 228

(56) References Cited

U.S. PATENT DOCUMENTS

| | | | | |
|---|---|---|---|---|
| 4,499,537 A | * | 2/1985 | Eckert et al. ................ 710/264 |
| 4,628,449 A | * | 12/1986 | Zardiackas .................. 710/269 |
| 5,687,381 A | * | 11/1997 | Swanstrom et al. ......... 710/269 |
| 5,815,701 A | * | 9/1998 | Slavenburg .................. 709/100 |
| 6,105,102 A | * | 8/2000 | Williams et al. ............. 327/142 |
| 6,412,035 B1 | * | 6/2002 | Webber ....................... 710/261 |

* cited by examiner

Primary Examiner—Kenneth S. Kim
(74) Attorney, Agent, or Firm—Marger Johnson & McCollom (57) ABSTRACT

The method and apparatus feature detecting and prioritizing one or more interrupt service requests; inserting interrupt servicing instructions responsive to the interrupt service request into an instruction queue mechanism; and processing the instructions within the instruction queue mechanism including the inserted interrupt servicing instructions. The instruction queue mechanism may include an instruction cache and an instruction fetch unit for fetching instructions from the instruction cache, wherein the processing includes decoding the instructions into micro-opcodes and executing the micro-opcodes in one or more out-of-order execution units. Further features include retiring the executed micro-opcodes including those micro-opcodes representing the inserted interrupt servicing instructions to the instruction cache. Preferably, the criteria for interrupting the core processor include the priority of the interrupts and the capacity of the processor to allocate bandwidth to interrupt servicing. Most preferably, the prioritizing is dynamically responsive to changing allocation criteria, e.g. a current-usage model.

26 Claims, 5 Drawing Sheets

ALLOCATION OF PROCESSOR BANDWIDTH BY INSERTING INTERRUPT SERVICING INSTRUCTIONS TO INTERVENE MAIN PROGRAM IN INSTRUCTION QUEUE MECHANISM

FIELD OF THE INVENTION

The present invention relates to digital processors, and more particularly to a method and apparatus for servicing hardware interrupts with greater frequency and efficiency.

BACKGROUND OF THE INVENTION

Interrupts are increasingly irregular inputs to a digital processor that cause high-overhead context switches whereby the processor halts its current program execution, saves its current context or status, services the interrupt, restores the interrupted context or status and resumes execution of the interrupted program. Examples of interrupts are input/output events that are not within the control of the digital processor to predict or to handle as anything other than an exception. Such exception handling is referred to in the computer world as a context switch. A context switch carries with it an especially high overhead in modern processors, which are equipped with instruction pre-fetch queues and look-ahead logic and instruction pipelines and caches that permit high speed computation. Intermediate results of processor operations must be discarded, e.g. by flushing the instruction pre-fetch cache, and much time is wasted in traditional response to an interrupt. Because interrupt processing is controlled by the digital processor hardware, its priority in time is secondary to the regular, streamlined code and data processing performed by the processor.

The trend is toward increased speed and functionality in computers such as personal computers (PCs), workstations, network servers and the like. But part of the increased speed and functionality is an increase in input/output (I/O) bandwidth and variety. Inputs to computers include keyboards, mouses, joysticks, video cards, musical instrument digital interfaces (MIDIs), compact disc read-only memory devices (CD-ROMs), small computer systems interface (SCSIs), disc drives, zip drives, fax-modems, e-mail and Internet downloads. All such inputs generate hardware interrupts to the processor. All such interrupts to a conventional processor requires a context switch in which the processor halts its current instruction flow, flushes the intermediate results of instruction pre-fetched macro-code execution, saves its address counters and status registers, and performs a branch to unrelated interrupt service routine code. After each hardware interrupt, the processor restores its status registers and address counters and resumes what it was doing. Such hardware interrupts are many—a busy mouse may generate hundreds of interrupts per second. Disc drives and video cards may generate thousands of interrupts per second, each. A single Internet application, while running on your personal computer, may generate tens of thousands of interrupts per second. The context switching overhead adversely impacts the performance of conventional processors each and every time one of these hardware interrupts occurs.

A video card generates a relatively low volume of interrupts at fairly regular intervals, e.g. when the video cache expires. A mouse or ajoystick generates a high volume of interrupts at fairly regular intervals, at least while the mouse or joystick is in use. A disc drive generates a relatively high volume of interrupts at irregular intervals. A modem that is being used in a network application similarly generates a relatively high volume of interrupts, also at irregular intervals. Because many network applications such as downloading files or page swapping are themselves disc-intensive, the pace of hardware interrupts from disc drives and modems in network applications are the most difficult to predict. Accordingly, network applications represent a significant challenge in the design of computers that are flexible and responsive to hardware interrupt servicing.

SUMMARY

The method includes detecting and prioritizing one or more interrupt service requests; inserting interrupt servicing instructions responsive to the interrupt service request into an instruction queue mechanism; and processing the instructions within the instruction queue mechanism including the inserted interrupt servicing instructions. The instruction queue mechanism may include an instruction cache and an instruction fetch unit for fetching instructions from the instruction cache, wherein the processing includes decoding the instructions into micro-opcodes and executing the micro-opcodes in one or more out-of-order execution units. The method further includes retiring the executed micro-opcodes including those micro-opcodes representing the inserted interrupt servicing instructions to the instruction cache. Preferably, the criteria for interrupting the core processor include the priority of the interrupts and the capacity of the processor to allocate bandwidth to interrupt servicing. Most preferably, the prioritizing is dynamically responsive to changing allocation criteria, e.g. a current-usage model. In accordance with one embodiment, an interrupt processor determines whether the detected interrupt service request is of a priority meeting one or more defined high-priority criteria and if so then signals the core processor to perform the inserting. Alternatively, the interrupt processor determines whether a natural core processor context switch is imminent and if so then signals the interrupt processor to make ready the highest priority interrupt service request and signals the instruction queue mechanism to fetch the readied interrupt service request in advance of the context switch.

The apparatus takes the form of a digital processor for use in a computer supporting one or more hardware interrupt inputs. The processor includes an instruction cache and a fetch-and-decode unit, the fetch-and-decode unit fetching instructions from the instruction cache and decoding the instructions into micro-opcodes. The processor also includes a dispatch-and-execute unit having one or more execution ports, the dispatch-and-execute unit scheduling and executing the micro-opcodes in the one or more execution ports and thereafter retiring the micro-opcodes back into the instruction cache. Finally, the processor includes an interrupt-handling mechanism responsive to one or more hardware interrupt inputs, the interrupt-handling mechanism instructing the fetch-and-decode unit to insert into a normal instruction sequence decoded micro-opcodes representing interrupt servicing instructions for scheduling and execution by the dispatch-and-execute unit.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
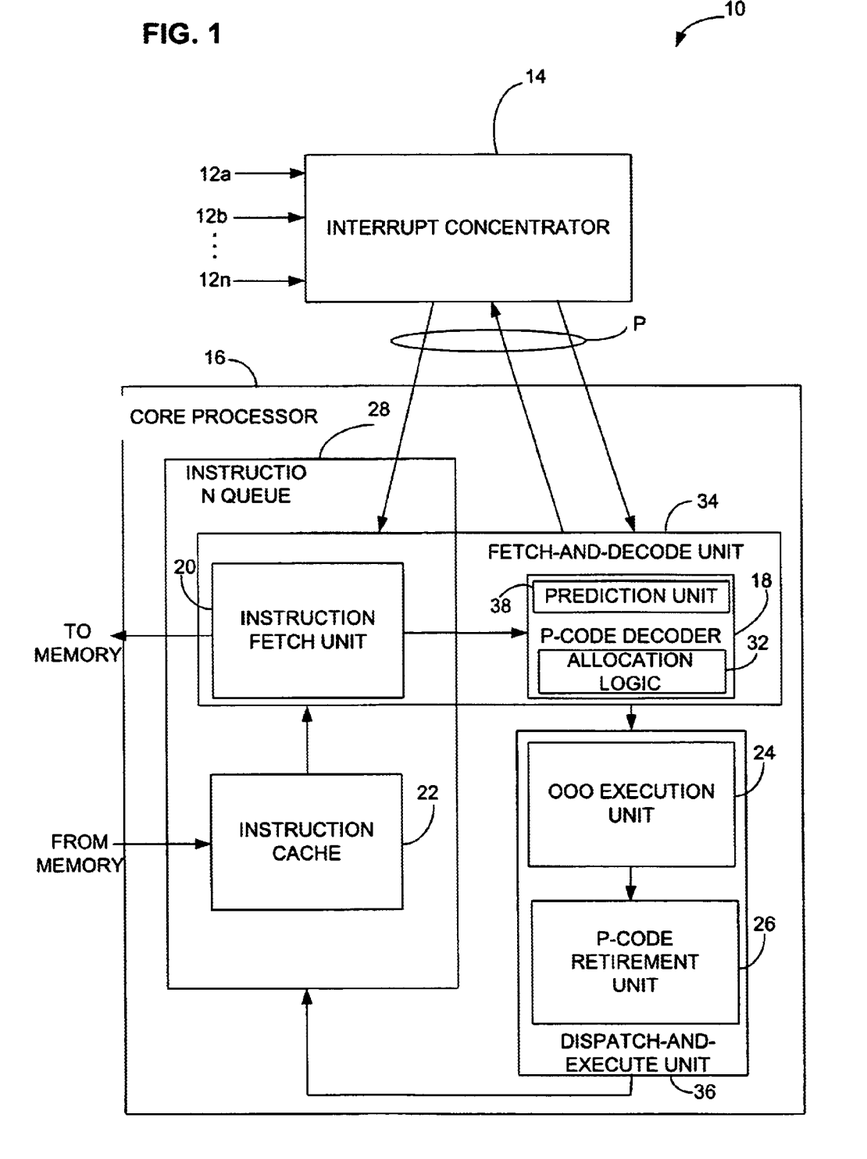
FIG. 1 is a block diagram of apparatus configured in accordance with the invention by which core processor bandwidth is allocated between routine processing and interrupt servicing.

FIG. 1 is a simplified system block diagram of the apparatus in accordance with the invention. The apparatus may be seen to include plural hardware interrupt signals 12a, 12b, . . . 12n for coupling to one or more hardware input/output (I/O) devices, not shown. It will be appreciated that the I/O devices generate hardware interrupt signals conventionally, the interrupt signals identifying the I/O device that generated the interrupt. Typical I/O devices include keyboards, mouses, joysticks, video cards, MIDIs, CD-ROMs, disc drives, zip drives, SCSIs, modems, etc. Modems are used as telecommunication vehicles for facsimile, e-mail, chat rooms, and world-wide web (network) browsing with its multimedia content, and the demand for high-performance telecommunications in personal computers, workstations and Internet service platforms grows daily.

Interrupt signals 12 are input to an interrupt concentrator 14, in accordance with the invention. Interrupt concentrator 14 detects one or more interrupts represented by interrupt signals 12 and ranks them in accordance with a determined priority scheme. Higher priority interrupts are handled before lower priority interrupts, as is typical. In accordance with the invention, interrupt concentrator 14 determines when a ranked hardware interrupt should be serviced, i.e. when a predefined demand threshold is met. Via a special port indicated in FIG. 1 by signal paths extending therefrom, interrupt concentrator 14 signals a core processor 16. Core processor includes a p-code decoder 18, and an instruction fetch unit 20. P-code decoder 18 is coupled with instruction fetch unit 20. Interrupt concentrator 14, core processor 16, p-code decoder 18 and instruction fetch unit 20 will be described in more detail by reference below to FIGS. 2, 3A and 3B.

Referring still to FIG. 1, core processor 16 may be seen also to include an instruction cache 22 coupled with the input of instruction fetch unit 20. Core processor 16 may be seen further to include an out-of-order (OOO) execution unit 24 coupled with the output of p-code decoder 18. Finally, core processor 16 may be seen to include a p-code retirement unit 26 coupled between OOO execution unit 24 and instruction cache 22. Each of these additional functional blocks forming a part of core processor 16 will be described in turn.

Instruction fetch unit 20 fetches instructions from memory and stores them in consecutive order within instruction cache 22. Instruction fetch unit 20 thus stages instructions for decoding by p-code decoder 18 to which its output instruction stream is routed. Instruction fetch unit 20 and instruction cache 22 will be referred to herein collectively as an instruction queue mechanism, indicated generally at 28. Instruction fetch unit 20 reads a predefined number of bytes, e.g. thirty-two bytes, from instruction cache 22 and routes some lesser number of bytes, e.g. sixteen bytes, to p-code decoder 18.

Instruction fetch unit 20 then hypothesizes what the next needed instructions will be by analyzing any branch instructions therein as to whether or not they are likely to be taken. Such analysis may include different prediction criteria for branches not before seen and those seen before. Branch predictions not seen before may be deferred to p-code decoder 18, which may use a static branch prediction algorithm to be described below. For branches that have been seen before, instruction fetch unit 20 may analyze historic information stored in a branch target buffer (not shown) within instruction fetch unit 20. Such instruction pre-fetching as is performed in accordance with the invention by instruction fetch unit 20 may also be referred to herein as instruction streaming.

P-code decoder 18 decodes the instructions received from instruction fetch unit 20 into a set of typically multiple, reduced instructions called micro-ops ($\mu$OPs). Preferably, p-code decoder 18 includes three parallel decoders and a micro-code instruction sequencer, not shown. Micro-ops are routed to a register alias table (RAT), also not shown. In the RAT, any register references and status information implicit within the $\mu$OPs are incorporated before the $\mu$OPs are stored in an instruction pool/reorder buffer (ROB), also not shown. The three parallel decoders have different capabilities for optimized decoding of instructions into $\mu$OPs. One of them is able to decode an instruction into 1–4 $\mu$OPs, while the other two can decode an instruction only into one $\mu$OP. Complex instructions, i.e. macro opcodes or Macro-Ops, in accordance with a complex instruction set (CISC) processor architecture are decoded by the microcode instruction sequencer into reduced instructions, e.g. $\mu$OPs, in accordance with a reduced instruction set (RISC) processor architecture.

Out-of-order execution unit 24 schedules and executes the $\mu$OPs stored in the ROB that is loaded by p-code decoder 18. A reservation station (RS) within out-of-order execution unit 24 continuously scans the ROB for $\mu$OPs that are ready to be executed and dispatches them to one or more of five execution ports. The five execution ports preferably include a first port including an integer unit, a floating point unit, an address generation unit, a packed arithmetic logic unit (ALU) and a packed multiply unit. A second port includes an integer unit, a packed ALU and a packed shift unit. The third through fifth ports include a load unit, a store address calculation unit and a store data unit.

Instruction retirement unit 26 simply stores the executed instructions from OOO execution unit 24, in their original consecutive order, into instruction cache 22 for future re-use by instruction fetch unit 20. Those of skill in the art will appreciate that instruction retirement ensures that instruction cache 22 thus will contain instructions that may be required by instruction fetch unit 20 when instruction fetch unit 20 performs its next instruction pre-fetch. This avoids the latencies related to memory bus contention and read access that otherwise would slow processing if the same instruction sequence is required to be performed again, as may often be the case.

Interrupt service can be very demanding due to its high volume and irregularity. Thus, in accordance with the invention, it is desired to involve highspeed core processor 16 in the routine servicing of interrupts. This is accomplished in accordance with the invention by inserting p-code into the above-described core processing of instructions. Thus the invented method and apparatus minimize the overhead associated with a costly context switch that effectively halts core processor 16; saves the program instruction counter; saves register contents and context flags; flushes instruction cache 22; executes the interrupt service routine; restores the register contents and context flags; restores the program instruction counter; re-loads instruction cache 22 from memory; and resumes execution of the interrupted program.

Those of skill in the art will appreciate that the invention is useful and greatly beneficial even if there is no retirement of executed µOPs to instruction cache 22. Of course, there will be a latency penalty when the interrupt vector, e.g. an interrupt service routine (ISR), is required to be executed again and it cannot be found in instruction cache 22. Nevertheless, there is still the great advantage of having core processor 16 responsive to interrupt service p-code inserted into the normal p-code execution stream, which minimizes disruption from context switching. Modem core processors such as core processor 16 provide such instruction recycling logic as is represented by instruction retirement unit 26 coupled with instruction cache 22. In this way, it is possible in accordance with the invention to realize an additional advantage: the ISR may be already staged for re-execution upon a like interrupt signal from interrupt concentrator 14.

Figure 2:
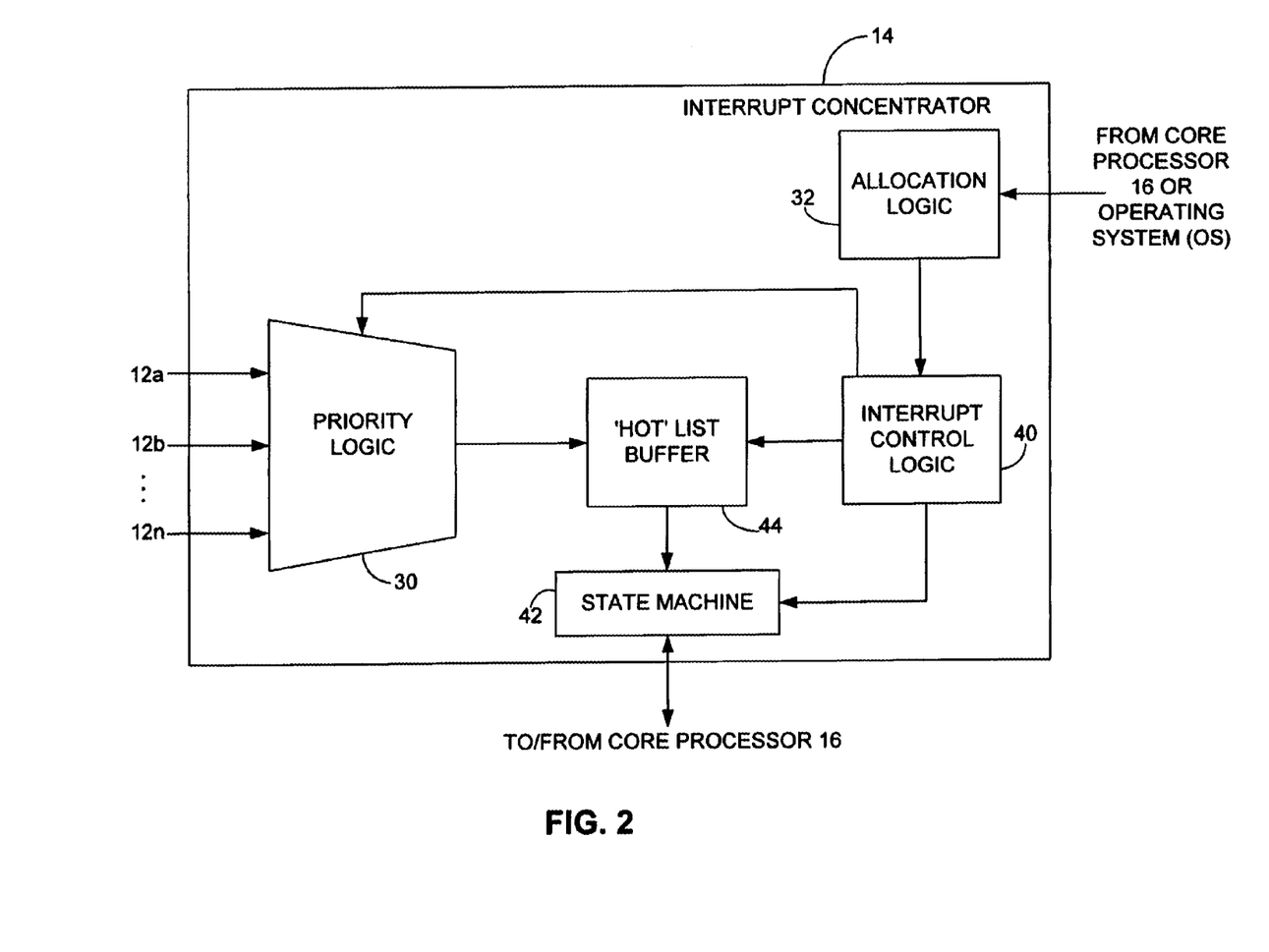
FIG. 2 is a schematic diagram of the interrupt concentrator that forms a part of the apparatus of FIG. 1.

FIG. 2 is a schematic block diagram of interrupt concentrator 14, which will be described in more detail below. In this embodiment, interrupt concentrator 14 includes interrupt control logic for signaling p-code decoder 18 and instruction fetch unit 20 in anticipation of an impending interrupt event. Pending event will be understood to refer to a scheduled interrupt as determined by interrupt concentrator 14 to be ready to process within a period of time that is predetermined to be relatively short. Such signaling by interrupt concentrator 14 may be accomplished by simply asserting a pending interrupt request signal to instruction fetch unit 20 to move the requested interrupt vector into instruction cache 22 and by simply informing p-code decoder 18 to expect a code-ready signal from instruction fetch unit 20.

Instruction fetch unit 20 responds to such a signal from interrupt concentrator 14 by determining whether the requested interrupt vector already is in instruction cache 22, in which case instruction fetch unit 20 simply sends a code-ready signal to p-code decoder 18. Alternatively, instruction fetch unit 20 responds to such a signal from interrupt concentrator 14 by fetching, e.g. performing a memory read cycle followed by a cache write cycle of, the requested interrupt vector into instruction cache 22 and then sending a code-ready signal to p-code decoder 18. P-code decoder 18 responds to the signal from interrupt concentrator 14 by arming an embedded state machine for the ISR p-code arrival from instruction fetch unit 20. Meanwhile, p-code decoder 18 runs out the normal instructions already within instruction fetch unit 20. In other words, p-code decoder 18 continues to operate normally by reading CISC instructions from instruction cache 22, decoding the instructions into RISC instructions and feeding the RISC instructions to OOO execution unit 24.

It is possible that instruction cache 22—which has been starved since instruction fetch unit 20 was signaled by interrupt concentrator 14—will run out of instructions before the ISR code is loaded therein. In this case, p-code decoder 18 halts momentarily (e.g. a few master clock cycles) until the arrival of the code-ready signal. While this represents a worst-case scenario, it may be avoided or its adverse impact minimized by fine-tuning the timing by which interrupt concentrator 14 signals instruction fetch unit 20 and p-code decoder 18 in anticipation of an interrupt event.

It is also possible that while p-code decoder unit 18 awaits receipt of the code ready signal from instruction fetch unit 20, interrupt concentrator 14 may trigger the interrupt, i.e. the pending interrupt that was earlier signaled by interrupt concentrator may ripen into a present interrupt event. In this case, a context switch occurs in which the ISR is executed as soon as one or more instructions reach instruction cache 22 and data or other needed operands are available. While this represents less-than-optimal performance in accordance with the invention, its adverse impact may be reduced also by fine-tuning the timing by which interrupt concentrator 14 signals instruction fetch unit 20 and p-code decoder 18 in anticipation of an interrupt event.

Most probably, upon receipt of the code-ready signal from instruction fetch unit 20 indicating that one or more ISR instructions have been loaded into instruction cache 22, p-code decoder 18 begins decoding the interrupt service routine code as it is read from instruction cache 22. This represents a best-case scenario in which the greatest potential advantage of the invention in increasing the efficiency and responsiveness of core processor 16 to hardware interrupts is realized. It is also the most likely case, when instruction fetch latency is well-defined and relatively constant and when the timing by which interrupt concentrator 14 anticipates an interrupt service requirement is properly tuned. Those of skill in the art will appreciate that such timing may be variable and adaptive to dynamically changing rates of instruction fetch unit supply and OOO execution unit and interrupt concentrator demand.

Those of skill in the art will appreciate that the interrupt vector typically is an interrupt service routine (ISR) represented, for example, by a starting address in memory of the ISR. Under interrupt chaining conventions, plural interrupts at the same level typically share an interrupt line while representing plural distinct interrupt service requirements. In these chained-interrupt cases, the interrupt vector may be two or more ISRs represented, for example, by a starting address in memory of the first of plural chained ISRs. Chained ISRs by their own chaining protocol typically execute in succession as though they were a single, longer routine. In other words, their chaining involves the continued execution of any and all routines linked within the ISR chain.

Accordingly, those of skill in the art will appreciate that when interrupt concentrator 14 signals p-code decoder 18 and/or instruction fetch unit 20 with an interrupt vector, the interrupt vector may represent one or more ISRs to be executed back to back. Those of skill in the art also will appreciate that the number of ISRs represented by an interrupt vector is transparent to the invention in accordance with the embodiments described and illustrated herein. In other words, the invention need not know whether or not ISRs are chained and does not care.

In an alternative embodiment of interrupt concentrator 14, p-code decoder 18 includes interrupt insertion logic for signaling interrupt concentrator 14 of an impending natural context switch. A natural context switch represents an opportune time for insertion of interrupt servicing p-code into the normal instruction process. One example of an impending natural context switch is anticipation of a macro-code boundary, i.e. a new instruction, scheduled for imminent decode and execution. Another example of an impending natural context switch is an immediate unconditional direct branch instruction, e.g. jmp label, or an instruction that pushes an address to an address stack, e.g. a pushae or pushad. In either case, a context switch is imminent and inevitable, which presents a near-term opportunity for efficient interrupt service processing.

In accordance with the interrupt insertion embodiment of the invention, interrupt concentrator 14, in response to the impending natural context switch signal from p-code decoder 18, readies the highest-priority interrupt vector from a pending "hot" list representing concentrated hardware interrupt requests. Then interrupt concentrator 14 directly signals instruction fetch unit 20 to fetch the highest priority requested interrupt vector (typically an ISR) into instruction cache 22. Meanwhile, p-code decoder 18 no longer requests normal code from cache 22 via instruction fetch unit 20. (Out-of-order execution unit 24 eventually stalls in this scenario, as intended, so that interrupt servicing begins at the opportune threshold of the natural context switch that triggered the interrupt servicing.) When instruction cache 22 is loaded with the highest priority interrupt vector (code), in response to the direct signaling from interrupt concentrator 14, instruction fetch unit 20 signals p-code decoder 18 of the fact.

As soon as one or more ISR instructions is in process within p-code decoder 18, p-code decoder 18 signals interrupt concentrator 14 to de-assert the interrupt request signal, or interrupt event, line from the interrupt concentrator's interrupt control logic. (Those of skill in the art will appreciate that the actual interrupt line from the hardware that produced the interrupt is de-asserted ultimately by the hardware itself in response to some form of acknowledgement from the ISR servicing the interrupt, e.g. the setting or clearing of an interface status bit.)

P-code decoder 18 then tracks how much time or how many events there are to service until normal service may resume. P-code decoder 18 signals interrupt concentrator 14 if more interrupts may be serviced during the present interrupt insertion cycle of core processor 16. Again, interrupt concentrator 14 readies the highest-priority pending interrupt vector and signals op-code decoder 18 to signal instruction fetch unit 20 to fetch the interrupt vector (code) corresponding therewith into instruction cache 22. The signaling processes between interrupt concentrator 14 and p-code decoder 18, and those between instruction fetch unit 20 and p-code decoder 18, are repeated for so long as a priority interrupt is pending and there is available opportunity for interrupt processing within core processor 16. Thereafter, interrupt concentrator 14 signals p-code decoder 18 that the pending priority interrupt queue, or hot list, is empty. Such interrupt insertion will be understood effectively to achieve so-called hardware interrupt service 'pipelining' that is unprecedented in core processing architectures.

The timing of the interrupt insertion cycle, i.e. the duration of the open window of opportunity for efficient interrupt servicing, may be programmable. Typically a so-called 'time-slice' is defined during which p-code decoder 18 and interrupt concentrator 14 may continue interrupt processing of any hot list vectors. Those of skill will appreciate that all hot interrupts may be serviced within the established time-slice, in which case p-code decoder unit 18 signals instruction fetch unit 20 to resume normal code caching. When the established time-slice nears expiration, i.e. the interrupt service window is closing, then p-code decoder 18 signals interrupt concentrator 14 that the currently executing ISR is the last ISR that may be processed during the present time-slice. After the currently executing ISR is run to completion, p-code decoder 18 signals instruction fetch unit 20 to fetch the line code that was running when the natural context switch occurred.

Ideally, of course, the processing of the last hot interrupt event will be just completed within the interrupt handling time-slice so that normal processing of instructions begins just as interrupt processing ends. It is possible within the spirit and scope of the invention to approach this ideal scenario by adaptive techniques. For example, the duration of the time-slice may be a programmed variable based at least in part upon which applications are running on the computer. Other contextual information may be used to make the time-slice dynamically responsive to real-time interrupt servicing, perhaps in accordance with current-usage models and/or predictive behavior models.

Those of skill in the art will appreciate that interrupt concentrator 14 may be implemented, within the spirit and scope of the invention, in a combination of hardware and firmware, with programmable variables being implemented preferably in software. Such programmable variables preferably include interrupt priority and timing criteria as well as core processor bandwidth utilization criteria. They may be programmed by a resident operating system (OS) and/or by OOO execution unit 24, by way of initialization and feedback, respectively. For example, the criteria may initially be established by the OS, which may assume a general usage model for all applications running thereon, including those that may be interrupt-intensive. Thereafter, the criteria may be changed in dynamic response to a particular usage model as determined by OOO execution unit 24 or auxiliary part of core processor 16 and based upon actual utilization of core processor bandwidth. Most preferably, the criteria for interrupt processing relative to routine processing within core processor 16 is dynamically responsive to a user. Thus, within the spirit and scope of the invention, current-usage models may dynamically govern processor bandwidth allocation within core processor 16 among routine and hardware interrupt tasks.

Those of skill in the art will appreciate that interrupt concentrator 14 may be programmed to give higher priority to disc drive and modem interrupts than to video card interrupts, thereby enhancing the performance of server applications. Interrupt concentrator 14 may be programmed to give higher priority to keyboard and mouse or joystick interrupts than to modem interrupts, thereby enhancing the performance of word processing or computer-aided design (CAD) applications. Interrupt concentrator 14 may be programmed to give higher priority to video card and joystick interrupts than to disc drive interrupts, thereby enhancing the performance of video games. The invention thus involves the core processor intimately in the application-textured real world of hardware interrupts.

Priority preferably thus is not fixed, but instead is dynamically responsive to changing computer applications and environments. In accordance with the invention, interrupt concentrator 14 is programmable so that the priority criteria may be adjusted in real-time response to changing computer application demands. One or more current-usage models may influence the priority criteria upon which interrupt concentrator 14 bases its ranking and timing of interrupt event handling, in real-time response to changing behaviors of computer applications or their users.

Interrupt concentrator 14 will be understood by those of skill in the art preferably to provide interrupt queuing, priority contention and determination and multiplexing functions. The functions are performed in accordance with the invention in such manner as to permit the highest priority one or more interrupts to be acknowledged to the I/O device requesting service and queued for handling by p-code decoder 18 and optionally instruction fetch unit 20, as described above. Such queuing preferably involves identifying the hardware interrupt request level or port and time-stamping the request for priority purposes. One or more buffers may be included in interrupt concentrator 14, or such may form a part of port 16 to be described immediately below, such buffers being configured as interrupt queues that maintain the relative time and port information described above. The multiplexing function may be understood to be straightforward selection of interrupt requests into one or more of such buffers as it may be determined that the request is of sufficiently high priority.

In accordance with the interrupt control method of operation of interrupt concentrator 14, interrupt concentrator 14 may be programmed to schedule an interrupt event in accordance with one or more criteria. While two such criteria and their combination are described immediately below, those of skill in the art will appreciate that, within the spirit and scope of the invention, any suitable criterion or combination of criteria may be used.

Interrupt concentrator 14 may signal p-code decoder 18 on a lapsed-time basis, e.g. every ten milliseconds (assuming there is an interrupt event to be scheduled). Those of skill in the art will appreciate that the period of such time-based signaling may range more broadly from fewer than hundreds of microseconds, e.g. 500 $\mu$s, to more than tens of milliseconds, e.g. 50 ms, or any other suitable periods.

Alternatively, interrupt concentrator 14 may signal p-code decoder 18 on an event-count-threshold basis, e.g. every ten interrupts. Those of skill in the art will appreciate that the threshold of such event count-based signaling may range more broadly from one to dozens or even hundreds of hardware interrupt events, or any other suitable counts.

The two above and/or other criteria may be combined, within the spirit and scope of the invention. For example, interrupt concentrator 14 may signal p-code decoder 18 every 10 ms or ten interrupts, whichever occurs first. Alternatively, interrupt concentrator 14 may signal p-code decoder 18 every 10 ms and ten interrupts, whereby both a defined time lapse and a defined event count threshold must be met prior to signaling.

Those skilled in the art will appreciate that interrupt concentrator 14 preferably is responsive to allocation criteria including not only the interrupt demand placed thereon by the hardware I/O devices but also the bandwidth of core processor 16. Thus, in accordance with the invention, the signaling criteria including the time between interrupts and/or the number of pending interrupts are programmable, e.g. by the resident operating system. By rendering the criteria programmable, the core processor's total bandwidth may be fairly allocated between normal and interrupt or exception handling. In other words, the resident operating system can program interrupt concentrator 14 to interrupt every 5 ms or every 15 ms, or every five interrupts or every fifteen interrupts, depending upon overall core processor bandwidth allocation algorithms that may be application-specific. Such variables within interrupt concentrator 14 most preferably are initialized to default values when the computer is booted and periodically or continuously tailored or adjusted to instantaneous hardware interrupt demands and to instantaneous core processor bandwidth.

Another aspect of the invention will be referred to herein as look-ahead interrupt servicing, or interrupt queuing within interrupt concentrator 14. In accordance with this aspect of the invention, an event pending message is sent out, i.e. interrupt concentrator 14 signals p-code decoder 18, some time before the actual event is triggered. This accommodates any unavoidable latency involved in signaling and readying instructions within cache 22 for decoding by p-code decoder 18. For example, if the event scheduling criteria is every ten interrupts, then the signaling might occur after the seventh interrupt, thereby accommodating an average latency of three interrupts. In this manner, interrupt concentrator 14 effectively signals p-code decoder 18 to prepare for interrupt servicing.

The port P shown in FIG. 1 will be understood by those of skill in the art preferably to be a hardware port that includes the signal paths shown therein. It also may include one or more buffers, a control bus including one or more signal lines, and a data bus including one or more data signal lines. The control bus preferably provides for the signaling described above between interrupt concentrator 14 and p-code decoder 18. The control bus optionally may provide for the signaling described above between interrupt concentrator 14 and instruction fetch unit 20 and OOO execution unit 24. Such signaling as defines port P may be in accordance with any suitable protocol, within the spirit and scope of the invention. The buses and any included buffers are preferably high-speed and most preferably are configured for parallel data and/or control transfers among concentrator 14, p-code decoder 18, instruction fetch unit 20 and OOO execution unit 24.

Figure 3A:
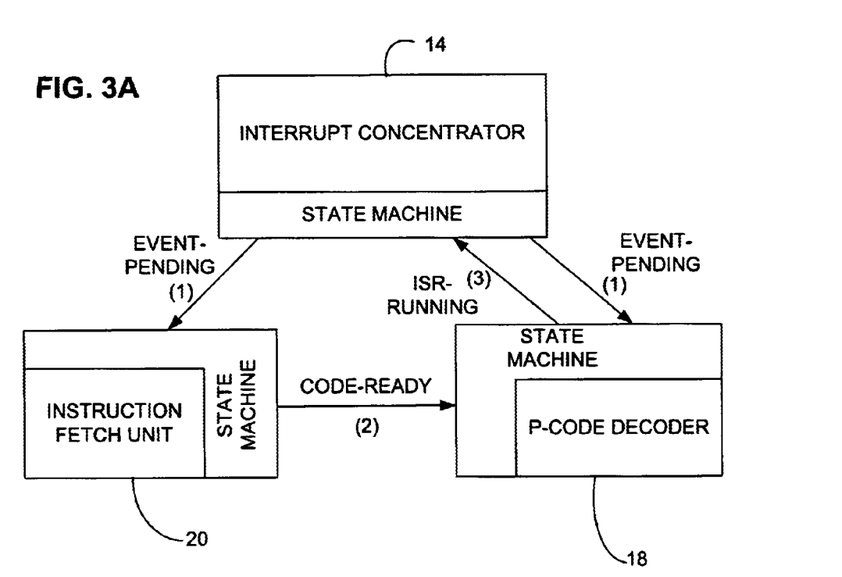
FIGS. 3A and 3B are state diagrams of the invented signaling mechanisms among the interrupt concentrator, instruction fetch unit and p-code decoder that form a part of the core processor architecture of FIG. 1, the state diagrams corresponding with two different embodiments of the interrupt concentrator of FIG. 2.
Figure 3B:
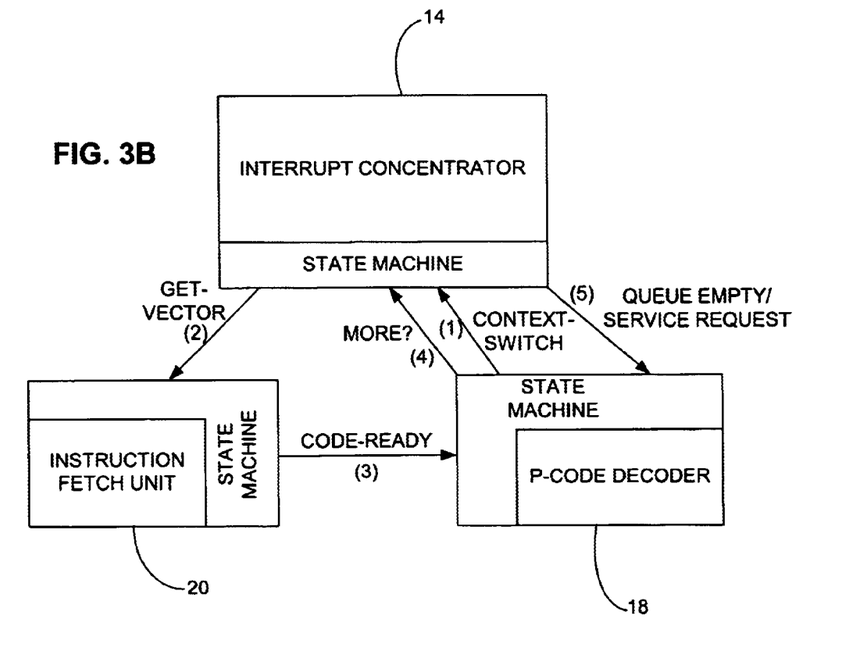

FIGS. 3A and 3B are state diagrams illustrating the invented signaling mechanisms among interrupt concentrator 14, p-code decoder 18 and instruction fetch unit 20. FIG. 3A illustrates an embodiment of the invention (corresponding with FIG. 2) in which interrupt concentrator 14 controls the insertion of interrupt servicing into the normal operation of core processor 16 based upon demand, i.e. the occurrence of an impending interrupt event for which interrupt service is required. FIG. 3B illustrates an alternative embodiment of the invention (also corresponding with FIG. 2) in which p-code decoder 18 controls the insertion of interrupt servicing into the normal operation of core processor 16 based upon supply, i.e. the availability of an impending time slice, e.g. a natural context switch, during which core processor 16 readily may accommodate interrupt service.

Referring to FIG. 3A, interrupt concentrator 14 includes a state machine, preferably coded in software or firmware or a combination thereof. The state machine first signals p-code decoder 18 and instruction fetch unit 20 that there is an interrupt event pending, i.e. that an interrupt meeting the given priority criteria is imminent. In response to the signaling from interrupt concentrator 14, a state machine forming a part of p-code decoder 18 transitions to a state of waiting. This first signaling, or signal mechanism, is denoted (1).

In response to the signaling from interrupt concentrator 14, a state machine forming a part of instruction fetch unit 20 determines whether the instruction stream representing the requested interrupt service routine already is in instruction cache 22 (not shown in FIG. 3A, for clarity).

If the interrupt service routine instructions are found already to reside within instruction cache 22, then the state machine of instruction fetch unit 20 immediately signals p-code decoder 18 with a code-ready signal. Such readiness typically would occur when the same interrupt service routine is needed routinely, and already has been fetched once, executed and retired to the instruction cache 22 as is customary. This second signaling, or signal mechanism, is denoted (2).

If it is determined that the interrupt service routine instructions are not already within instruction cache 22, then the state machine of instruction fetch unit 20 immediately fetches such instructions not already resident in instruction cache 22. It does so by reading them from memory at the designated vector address, whether pre-assigned or designated by interrupt concentrator 14. The state machine of instruction fetch unit 20 enters a wait state until the interrupt service routine instructions, or at least some of them, are retrieved from memory and placed in instruction cache 22. When the instructions are resident, the state machine of instruction fetch unit 20 immediately signals p-code decoder 18 with a code-ready signal. This third signaling, or signal mechanism, is denoted (3).

Upon such code-ready signaling by instruction fetch unit 20, p-code decoder 18 transitions from its wait state to an acknowledgement state in which it signals interrupt concentrator 14 that the interrupt service request has been honored. This fourth signaling, or signal mechanism, is denoted (4).

In response to such acknowledgement, interrupt concentrator 14 de-asserts its event pending signal from both p-code decoder 18 and instruction fetch unit 20. The state machine within interrupt concentrator 14 then returns to its initial idle state and awaits another priority interrupt. Those of skill in the art will appreciate that the interrupt service routine effectively removes the hardware interrupt that gave rise to the interrupt servicing—e.g. by setting or clearing an interrupt request-pending status bit in a hardware interface associated with the hardware device—upon execution of an instruction within the ISR.

Referring to FIG. 3B, p-code decoder 18 includes a state machine, preferably coded in software or firmware or a combination thereof. The state machine first signals interrupt concentrator 14 that an instruction or instruction sequence dispatched to and currently in process within OOO execution unit 24 will result in an impending context switch. Such a state machine preferably includes a context switch prediction unit that predicts naturally occurring context switches in anticipation thereof. Such predictions are predicated on the routine, i.e. interrupt-independent, instruction stream that most recently was decoded by p-code decoder 18 for dispatch and execution by OOO execution unit 24. Such prediction unit may be realized in accordance with the invention in the form of hardware, firmware or software within core processor 16. This first signaling by, or signal mechanism within, the state machine of p-code decoder 18 is shown in FIG. 3B as a get-ready signal denoted (1).

A state machine within interrupt concentrator 14 responds to the get-ready signal by readying the hot list of hardware interrupts requiring service. Those of skill will appreciate that such interrupts are prospective, and subject at least to reordering in terms of priority, before one or more of them is signified, as by the signaling of instruction fetch unit 20. When the hot list is established, the state machine within interrupt concentrator 14 signals a state machine within instruction fetch unit 20 to get one or more vectors, e.g. ISRs, ready for insertion into the normal instruction stream. This second signaling, or signal mechanism, is shown in FIG. 3B as a get-vector signal denoted (2).

A state machine forming a part of instruction fetch unit 20 responds to the get-vector signal from the state machine of interrupt concentrator 14 as above. In other words, the state machine determines whether the vector corresponding with the first interrupt vector on the 'hot' list already resides in instruction cache 22 and if not then reads memory to load instruction cache 22. When the code is resident within the cache the state machine within instruction fetch unit 20 signals p-code decoder 18 with a code-ready signal. This third signaling, or signal mechanism, is denoted (3).

In response to the code-ready signal, the state machine within p-code decoder 18 determines how much time is available for interrupt servicing prior to a resumption of normal service. In other words, in accordance with the invention, the state machine within p-code decoder 18 estimates based upon its 'knowledge' of the nature and probable duration of the detected natural context switch and other core processor priorities and allocates a time slot to the instant interrupt servicing. The state machine within p-code decoder 18 then signals interrupt concentrator 14 if more interrupts can be handled during the present insertion cycle. The cycle thus may be repeated, as described above. This fourth signaling, or signal mechanism, is denoted (4).

In response to the more-interrupts query, the state machine within interrupt concentrator 14 signals the state machine within p-code decoder 18 that its interrupt queue is empty, e.g. the repeated cycle is complete. Alternatively, the state machine within interrupt concentrator 14 signals the state machine within p-code decoder 18 that it has an immediate service request. In the latter event, which represents a hybrid implementation of the two state machine embodiments, it will understood that the state machines within interrupt concentrator, p-code decoder 18 and/or instruction fetch unit 20 implement features of both architectures. All such state machine protocols are contemplated, and are within the spirit and scope of the invention. This fifth signaling, or signal mechanism, is denoted (5).

Turning briefly back to FIGS. 1 and 2, interrupt concentrator 14 may be understood now to include priority logic, or what may be thought of as a 'smart' multiplexer, 30 for ranking and selecting one or more hardware interrupts 12 as a pending event. Priority logic 30 may be micro-programmed by the resident operating system or may be responsive to signaling from p-code decoder 18 to optimally allocate core processor bandwidth under what may be a dynamically changing application environment. Such allocation logic 32 may form a part of a so-called fetch-and-decode unit 34 comprising instruction fetch unit 14 and p-code decoder 18. Alternatively, such allocation logic may form a part of a so-called dispatch-and-execute unit 36 comprising OOO execution unit 24 and p-code retirement unit 26. Finally, with respect to FIG. 1, a context switch prediction unit 38 is coupled with fetch-and-decode unit 34 for predicting a naturally occurring context switch, as described above with reference to FIG. 3A.

Those of skill in the art will appreciate that priority logic 30 and allocation logic 32 may take alternative forms, within the spirit and scope of the invention, and that within the spirit and scope of the invention they may reside anywhere within apparatus 10 or a computer system of which apparatus 10 may be part. Thus, it may be seen that a block within interrupt concentrator 14 is designated identically as allocation logic 32, which allocation logic may be thought of as a distributed function of apparatus 10 made in accordance with the invention.

FIG. 2 also shows a block labeled interrupt control logic 40, which will be understood to control the operation of priority logic 30 and of a state machine 42 within interrupt concentrator 14. Finally, FIG. 2 shows the above-described hot list buffer 44 that in accordance with the invention buffers those priority interrupts meeting the priority and timing criteria for signaling a pending event to core processor 10, as described. Those of skill in the art will appreciate that interrupt concentrator 14 may within the spirit and scope of the invention take alternative forms, and that it is preferably implemented in a combination of high-speed hardware and firmware to perform the needed interrupt concentration and signaling functions.

Figure 4:
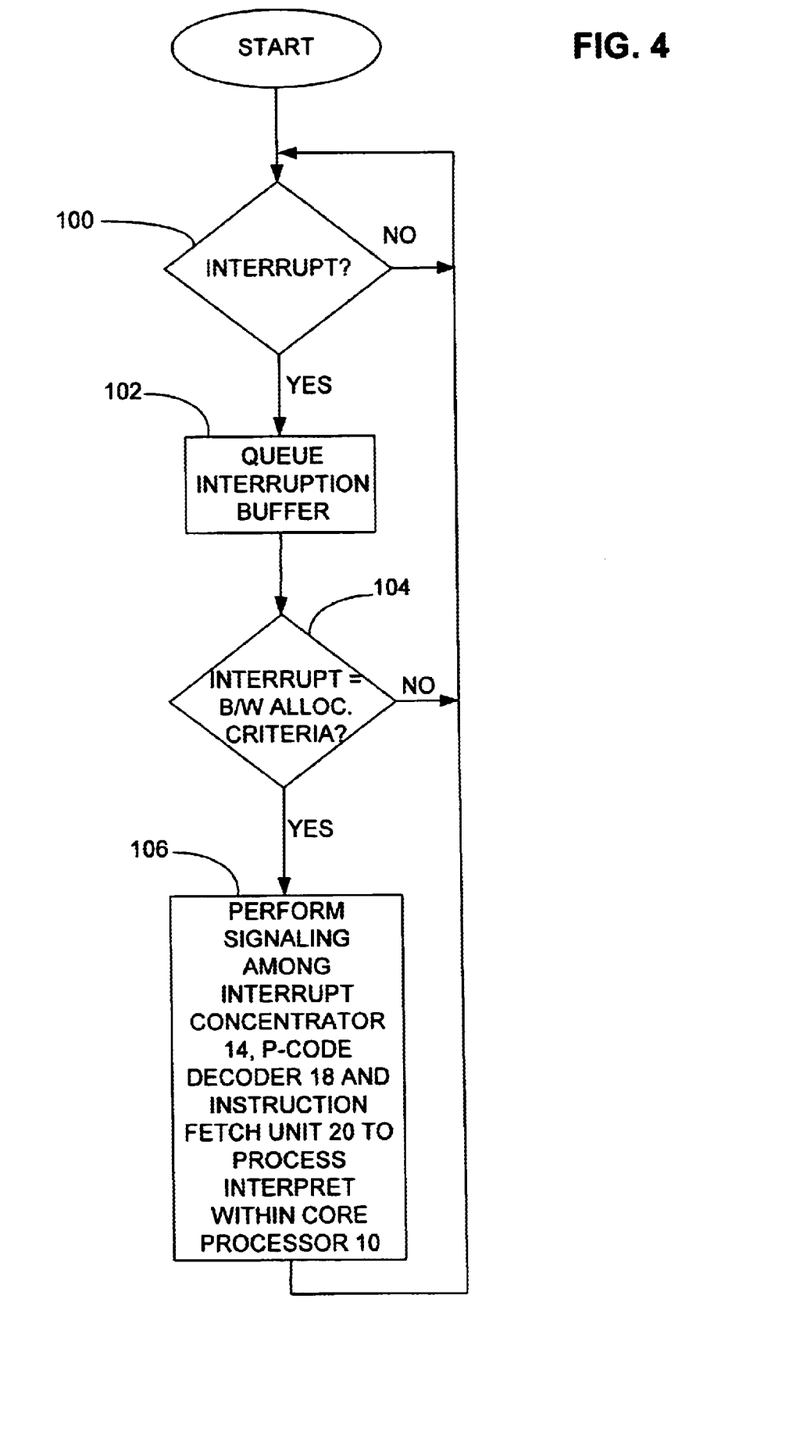
FIG. 4 is a flow chart of the core processor bandwidth-allocation method in accordance with the invention.

FIG. 4 is a flow chart illustrating the bandwidth-allocation method in accordance with the invention. The bandwidth-allocation method in one aspect of the invention starts at 100 with the detection of one or more hardware interrupts on one or more interrupt lines. At 102, the interrupt is queued, as in a buffer not shown, and its priority level determined. At 104, interrupt concentrator 14 determines whether the interrupt meets the current bandwidth-allocation criteria for either interrupting core processor 16 via event signal mechanism (1) to p-code decoder 18 and to instruction fetch unit 20 (refer FIG. 3A). It will be understood that the current bandwidth-allocation criteria preferably are maintained by interrupt concentrator 14 as programmed variables that are initialized and updated by an external allocation agent such as OOO execution unit 24 or the resident OS.

In this manner, interrupt servicing is responsive not only to the priority of the interrupts but also to the capacity of the processor to allocate bandwidth to interrupt servicing. If the criteria are not met, then control returns to block 100 where a further interrupt is awaited. If on the other hand it is determined at 104 that the criteria are met, then interrupt concentrator 14 at 106 performs the signaling described in detail above. This signaling is illustrated in FIGS. 2 and 3A, denoted therein as signal mechanisms (2)–(4), and in FIGS. 2 and 3B, denoted therein as signal mechanisms (2)–(5). These steps may be repeated, of course, as suggested by FIG. 4.

Such illustrated processor bandwidth allocation will be understood by those of skill in the art to be realized in accordance with the invention by establishing the criteria and communicating the same to interrupt concentrator 14 and thereafter by updating them as necessary to reflect current application-specific sensibilities. In this way, changing interrupt service demands are met with more or less resistance based not upon fixed criteria or underlying assumptions about the relative priority of normal and exception handling, but rather upon notions of greater responsiveness and productivity.

Figure 5:
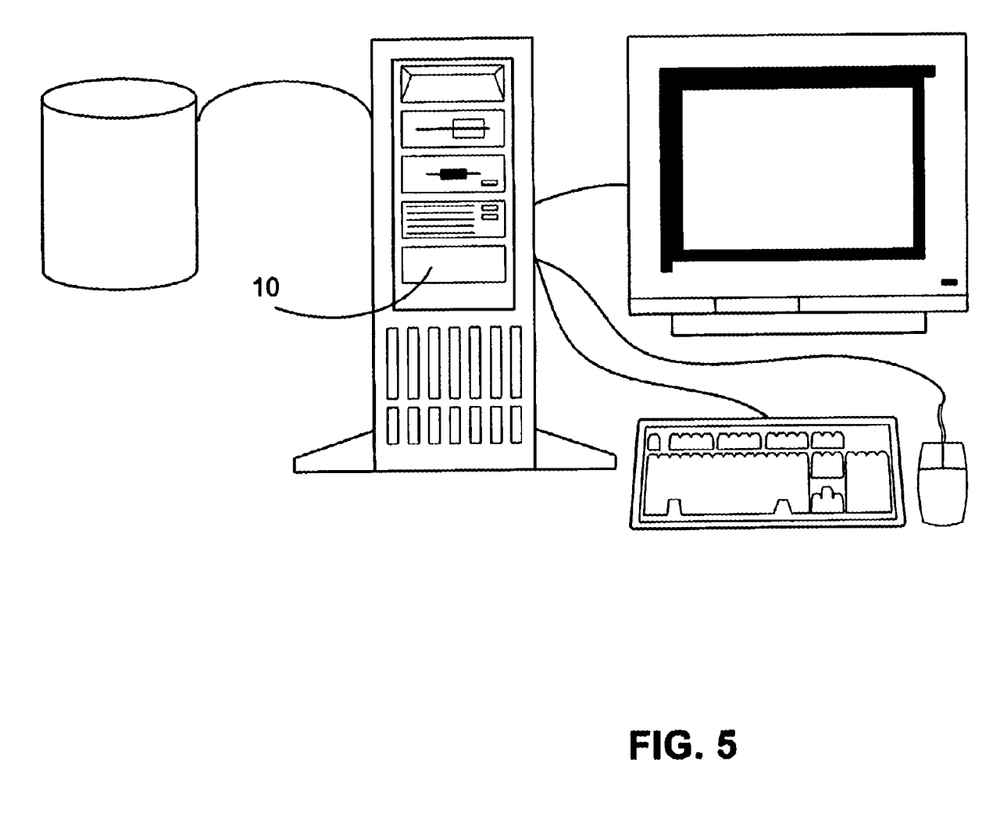
FIG. 5 is a system block diagram illustrating a computer system that incorporates the invention.

Turning now very briefly to FIG. 5, it may be seen that a computer system as illustrated may incorporate the invention, whether in the form apparatus 10 or the invented methods described and illustrated herein. Those of skill in the art will appreciate that the computer system as illustrated may include such I/O devices as a keyboard, mouse, monitor or external disc drive, operatively connected to a personal computer or workstation or server in the form of a tower or other hardware platform. Typically, those of skill in the art will appreciate that apparatus 10 would take the form of one or more processor integrated circuits (ICs) mounted on processor boards having memory devices and I/O interfaces including interrupt hardware. It is by virtue of the invention described and illustrated herein that such computer systems incorporating the invention will be more responsive to their users' changing needs in diverse new applications that are increasingly I/O intensive.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for allocating core processor bandwidth in a computer between routine processing and interrupt servicing, wherein the core processor includes mainline program instruction queue mechanism staging instructions for processing, the method comprising:

detecting an interrupt service request;

inserting interrupt servicing instructions responsive to the interrupt service request into the instruction queue mechanism in such manner that the inserted interrupt servicing instructions intervene the mainline program instructions within the queue mechanism thereby allocating core processor bandwidth between the inserted interrupt servicing instructions and the mainline program instructions; and processing the instructions within the instruction queue mechanism including the mainline program instructions and the inserted interrupt servicing instructions, wherein core processor bandwidth allocation between the mainline program instructions and the inserted interrupt servicing instructions is achieved by concurrent in-line staging of the same within the instruction queue mechanism.

2. The method of claim 1 in which the instruction queue mechanism includes an instruction cache and an instruction fetch unit for fetching instructions from the instruction cache, said processing being performed in such manner as to decode the instructions into micro-opcodes and execute the micro-opcodes in one or more out-of-order execution units.

3. The method of claim 2 which further comprises recycling the executed micro-opcodes for optional re-execution thereof in the one or more out-of-order execution units by retiring the executed micro-opcodes including those micro-opcodes representing the inserted interrupt servicing instructions to the instruction cache.

4. The method of claim 3 wherein the executed micro-opcodes are retired to the instruction cache in order.

5. The method of claim 1 wherein said detecting is of plural interrupts, which further comprises prioritizing such plural interrupts and inserting one or more instances of such interrupt servicing instructions into the instruction queue mechanism in accordance with one or more predefined interrupt servicing allocation criteria.

6. The method of claim 5 wherein the one or more allocation criteria include the priority of the interrupts and the capacity of the processor to allocate bandwidth to interrupt servicing.

7. The method of claim 6 wherein said prioritizing is dynamically responsive to changing allocation criteria.

8. The method of claim 1 wherein core processor bandwidth is allocated to interrupt servicing without flushing the instruction queue mechanism.

9. The method of claim 1 in which said detecting is performed by an interrupt processor, which after said detecting further comprises:

at the interrupt processor determining whether the detected interrupt service request is of a priority meeting one or more defined high-priority criteria and if so then signaling the core processor to perform said inserting; and at the core processor responding to said signaling by performing said inserting and said processing.

10. The method of claim 1 in which said detecting is performed by an interrupt processor, which at the core processor further comprises:

determining that a natural core processor context switch is imminent, said determining including analyzing one or more instructions within the instruction queue mechanism for context switch-inducing instructions;

signaling the interrupt processor to make ready the highest priority interrupt service request; and signaling the instruction queue mechanism to fetch the readied interrupt service request in advance of a context switch in response to said determining-by-analyzing.

11. A digital processor for use in a computer supporting one or more hardware interrupt inputs, the processor comprising:

an instruction cache;

a fetch-and-decode unit fetching instructions from said instruction cache and decoding the instructions into micro-opcodes;

a dispatch-and-execute unit having one or more execution ports, said dispatch-and-execute unit scheduling and executing the micro-opcodes in said one or more execution ports and thereafter recycling the micro-opcodes for optional re-execution by said dispatch-and-execute unit by retiring the micro-opcodes back into the instruction cache; and an interrupt-handling mechanism responsive to one or more hardware interrupt inputs, said interrupt-handling mechanism signaling said fetch-and-decode unit to insert, into a normal instruction sequence within the instruction cache without flushing the instruction cache, decoded micro-opcodes representing interrupt servicing instructions read from a memory for scheduling and execution by said dispatch-and-execute unit.

12. The apparatus of claim 11 in which the computer supports plural hardware interrupt inputs, wherein said interrupt-handling mechanism includes an interrupt concentrator for determining priority among the plural hardware interrupt inputs and for scheduling the plural hardware interrupt inputs, the interrupt-handling mechanism instructing said fetch-and-decode unit to insert plural instances of such decoded micro-opcodes, each instance representing one or more corresponding sets of interrupt servicing instructions, into the normal instruction sequence for serial scheduling and execution of the plural instances of such decoded micro-opcodes by said dispatch-and-execute unit in accordance with the determined priority of said plural hardware interrupt inputs.

13. The apparatus of claim 11 which further comprises:

a context switch prediction unit coupled with said fetch-and-decode unit predicting a naturally occurring context switch and for signaling said interrupt-handling mechanism upon such prediction, said context switch prediction unit analyzing one or more instructions within an instruction cache for context switch-inducing instructions, said interrupt-handling mechanism responsive to such signaling from said prediction unit instructing said fetch-and-decode unit.

14. Apparatus for allocating processor bandwidth to hardware interrupts in a computer comprising:

an instruction queue mechanism staging p-code for execution;

plural interrupt signals from one or more hardware input/output devices;

interrupt priority logic for ranking the relative priority of plural interrupts represented by the plural interrupt signals;

bandwidth allocation logic for determining a timing allocation by which a ranked one or more of the plural interrupts is to be serviced relative to the total time available for processing;

a p-code insertion mechanism for inserting interrupt servicing p-code in accordance with the determined timing into said instruction queue mechanism for processing;

a p-code processor coupled with said instruction queue mechanism and responsive to said insertion mechanism, said p-code processor executing p-code within said instruction queue mechanism, the executed p-code including the interrupt servicing p-code, and an in-order retirement unit retiring instructions back to said instruction cache.

15. The apparatus of claim 14, wherein said instruction queue mechanism includes an instruction cache and an in-order instruction fetch-and-decode unit performing branch predictions and wherein said p-code processor includes a dispatch and out-of-order execution unit scheduling and executing p-code in parallel among one or more execution ports.

16. The apparatus of claim 14 wherein said priority logic is responsive to a current-usage model.

17. The apparatus of claim 15 wherein said fetch-and-decode unit includes said allocation logic.

18. The apparatus of claim 17 wherein said allocation logic is responsive to a computer operating system.

19. The apparatus of claim 14 wherein said priority logic is responsive to a computer operating system.

20. The apparatus of claim 14 wherein said allocation logic is responsive to a current-usage model.

21. A method for allocating core processor bandwidth in a computer between routine processing and interrupt servicing, wherein the core processor includes a mainline program instruction queue mechanism staging instructions for processing, the method comprising:

detecting an interrupt service request;

inserting interrupt servicing instructions responsive to the interrupt service request into the instruction queue mechanism in such manner that the inserted interrupt servicing instructions intervene the mainline program instructions within the queue mechanism thereby allocating core processor bandwidth between the inserted interrupt servicing instructions and the mainline program instructions;

processing the instructions within the instruction queue mechanism including the mainline program instructions and the inserted interrupt servicing instructions, wherein core processor bandwidth allocation between the mainline program instructions and the inserted interrupt servicing instructions is achieved by concurrent in-line staging of the same within the instruction queue mechanism without first flushing the instruction queue mechanism of its contents, and recycling the executed micro-opcodes for optional re-execution thereof in the one or more out-of-order execution units by reordering and retiring the executed micro-opcodes including those micro-opcodes representing the inserted interrupt servicing instructions to the instruction cache.

22. An article of manufacture for use with a core processor including an instruction queue, the article comprising a computer-readable medium containing a program, the program comprising:

detection firmware for detecting an interrupt service request;

insertion firmware for inserting interrupt servicing instructions responsive to the interrupt service request into the instruction queue;

processor firmware for processing the instructions within the instruction queue including the inserted interrupt servicing instructions; and signaling firmware coupled with said insertion firmware for signaling said detection firmware upon detection by said signaling firmware of an impending natural context switch represented by a recognized instruction sequence within said instruction queue, detection of the impending natural context switch being predicated on an instruction stream within the instruction queue of the core processor.

23. A computer-readable medium containing a program according to claim 22 wherein the program further comprises:

signaling firmware coupled with said detection firmware for signaling said insertion firmware with a vector representing an interrupt service request upon a determination by said detection firmware that an interrupt service request of a priority that exceeds a given threshold has occurred, said insertion firmware fetching interrupt service instructions from memory in accordance with the vector representing the determined priority interrupt service request.

24. A computer system comprising:

one or more input/output (I/O) devices each capable of generating one or more hardware interrupts;

an interrupt concentrator priority-ranking and queueing plural interrupts into an ordered interrupt array;

a core processor coupled with said interrupt concentrator, said core processor including an instruction cache, a fetch-and-decode unit, said fetch-and-decode unit fetching instructions from said instruction cache and decoding the instructions into micro-opcodes, said core processor further including a dispatch-and-execute unit having one or more execution ports, said dispatch-and-execute unit scheduling and executing the micro-opcodes in said one or more execution ports and thereafter retiring the micro-opcodes back into the instruction cache; and an interrupt-handling mechanism responsive to said one or more hardware interrupts, said interrupt-handling mechanism instructing said fetch-and-decode unit to insert into a normal instruction sequence decoded micro-opcodes representing interrupt servicing instructions for scheduling and execution by said dispatch-and-execute unit.

25. The computer system of claim 24 which supports plural hardware interrupt inputs, wherein said interrupt-handling mechanism includes an interrupt concentrator for determining priority among and scheduling the plural hardware interrupts, the interrupt-handling mechanism instructing said fetch-and-decode unit to insert plural instances of such decoded micro-opcodes, each instance representing one or more corresponding sets of interrupt servicing instructions, into the normal instruction sequence for serial scheduling and execution of the plural instances of such decoded micro-opcodes by said dispatch-and-execute unit in accordance with the determined priority of said plural hardware interrupts.

26. The computer system of claim 24 which further comprises:

a context switch prediction unit coupled with said fetch-and-decode unit predicting a naturally occurring context switch represented by a recognized instruction sequence within said instruction cache and for signaling said interrupt-handling mechanism upon such prediction, said interrupt-handling mechanism responsive to such signaling from said prediction unit instructing said fetch-and-decode unit.

* * * * *

UNITED STATES PATENT AND TRADEMARK OFFICE
CERTIFICATE OF CORRECTION

PATENT NO.    : 6,662,297 B1
DATED         : December 9, 2003
INVENTOR(S)   : Boom et al.

It is certified that error appears in the above-identified patent and that said Letters Patent is hereby corrected as shown below:

Column 16,
Line 3, "p-code, and" should read -- p-code; and --.

Signed and Sealed this

Twenty-third Day of November, 2004

JON W. DUDAS
*Director of the United States Patent and Trademark Office*